Feb. 11, 1964 V. C. J. PETERSON ETAL 3,120,734
SPLICES
Filed Nov. 29, 1961
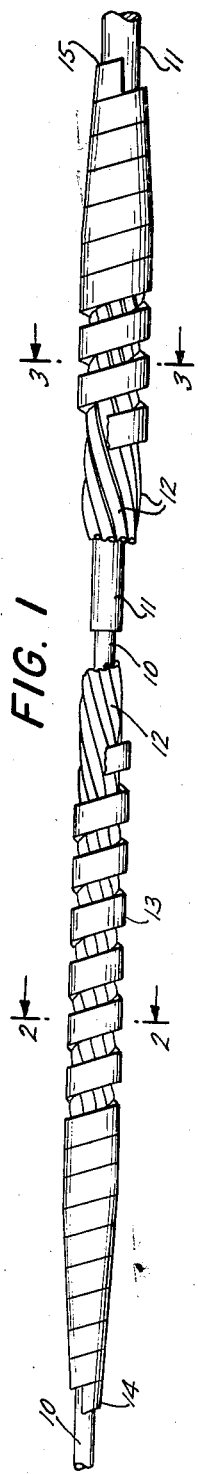
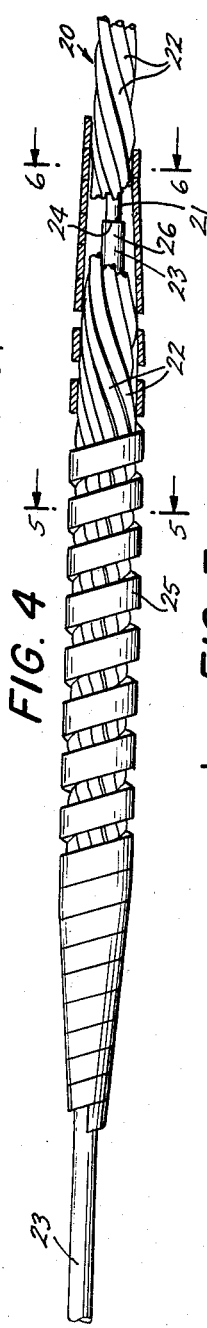
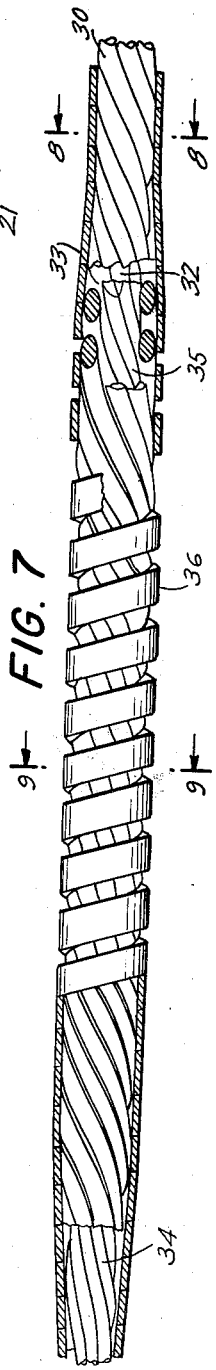
Vincent C. J. Peterson
William J. Gilmore
INVENTORS
BY James T. Bethell United States Patent Office 3,120,734
Patented Feb. 11, 1964

3,120,734
SPLICES
Vincent C. J. Peterson, Huntingdon Valley, Pa., and William J. Gilmore, Manitou Beach, Mich., assignors to American Chain & Cable Co. Inc., New York, N.Y., a corporation of New York
Filed Nov. 29, 1961, Ser. No. 155,784
9 Claims. (Cl. 57—142)

This invention relates to wire lines and in particular, to splices in such lines. The invention is particularly concerned with splices between lines of different diameters.

In general, wire lines, by which is meant wires or groups of wires, are uniform from end to end. There have been some attempts to provide a tapered or stepped structure, as in mining ropes and in earth boring applications, where the weight of the line, because of its extreme length, is a factor to be reckoned with. In recent years, however, wire lines have been required in which the material of the line is stressed to rather near its ultimate strength, and at the same time the line must be capable of passing over sheaves and around a drum or reel.

A particular example of such an application of wire lines is the towing of objects behind aircraft. Scientific and military uses of aircraft involving a towed object have now reached the point, because of the speed of the aircraft and the length of the tow line, at which a uniform line will part under tension generated by its own air resistance or drag, even though the weight and drag of the towed object are comparatively small. Under such circumstances, it is essential that the outer end of the line be as small as possible, to minimize its drag, and the diameter increased toward the inner end, to compensate for the tension generated by the drag of the line outboard. Theoretically, the line should be tapered.

As a practical matter, a stepped line is preferable, because of the difficulty of producing a taper in wire while maintaining desirable physical characteristics.

A stepped line could be produced, in a stranded structure, by stopping the strander and adding on wires or increasing their diameter, which has been done in the past in mine ropes. This process is very expensive and the product does not, in the small diameters contemplated, have the load as equally distributed among the wires as is desirable. For these reasons, a splicing technique has been devised, as a means for joining lines of different diameters.

The limitations placed on the technique are considerable. In many cases, the outermost portions of the wire lines are made of music wire, necessitating a splice to music wire. Music wire is an admirable tension material, but the usual ending is quite bulky, and entirely unsuited for passing over sheaves or winding on a reel. A splice to music wire must be made in such a fashion that the load is truly axial, and must involve no kinking, nicking or other deformation of the wire. In the case of music wire wound on reels or passed over sheaves, a minimum diameter for the splice is needed, to prevent kinking of the wire adjacent the splice. For the purposes contemplated, of course, the efficiency of the splices must be 100%.

In the case of strands, attached to strands the same considerations apply, although strand, in general, is not so sensitive to nicking and kinking as music wire is. On the other hand, it is necessary in strand splicing to assure that as far as possible each wire takes its assigned load.

With the above in mind, it is a primary object of the present invention to provide a splice for a wire line which can be utilized to secure lines of different diameters together, whether the lines are single wires, stranded structures, or both.

It is a further object of the present invention to provide a splice for wire lines which has a minimum tendency to cause concentration of stress and introduces a minimum of concentrated bending tendency tending to fatigue the material of the line.

Referring now to the drawings:

FIG. 1 is a view, with parts removed, of a splice between two lengths of music wire of different diameter;

FIG. 2 is a section taken on line 2—2 of FIG. 1, looking in the direction of the arrows;

FIG. 3 is a section taken on line 3—3 of FIG. 1, looking in the direction of the arrows;

FIG. 4 is a view, with parts broken away, of a splice between a wire and a strand;

FIG. 5 is a section taken on line 5—5 of FIG. 4;

FIG. 6 is a section taken on line 6—6 of FIG. 4, looking in the direction of the arrows;

FIG. 7 is a view of a splice between two strands of different diameters, with parts broken away;

FIG. 8 is a section on line 8—8 of FIG. 7;

FIG. 9 is a section on line 9—9 of FIG. 7; and

FIG. 10 is a fragmentary view of a portion of a splice between armored strands.

In all of these figures, the diameters of the wires are exaggerated, with respect to the length of the splice for the purpose of clarity in illustration.

Referring to FIGS. 1, 2 and 3, a form of splice is shown which is utilized to join solid wires of different diameters. In producing this splice, the wires 10 and 11 are butted together, and a plurality of wires 12 laid around the wires and secured in place. These wires 12 are preferably supplied as preformed, that is, in long, helical configuration, and, when applied to the wires, can be laid around them, forming in effect, a strand. The internal diameter of the helix formed in the wires 12 is slightly smaller than the diameter of the smaller line wire 10, in order that the wires 12 closely embrace it. No permanent deformation of the wires 12 is necessary to put them in place, as all bending and manipulating takes place below the elastic limit of the wires 12. As a practical matter, the laying around of the wires 12 is a very simple operation, consisting in holding the wires 12 by the center near the junction of the line wires 10 and 11, and simply twisting the wires with the fingers around one line wire 10, and subsequently around the other line wire 11. The wires readily fall into the correct position.

The particular size of wire used for the splice is indicated by the strength required. As the load is transferred from the smaller to the larger wire by the aggregate of the wires 12, the total strength of the wires 12 obviously must be at least as great as that of the wire 10. It is desirable, in order that the splice readily pass over sheaves without interference, that it be as small in diameter as possible. The strength requirements plus the need for flexibility set an optimum size and number for the wires 12.

It is necessary to secure the wires 12 at the ends to prevent them from unravelling. This function could be performed by a swaged or pressed-on fitting, but one of sufficient strength to adhere would be of a diameter great enough to kink the wire line as it passes over pulleys. In addition, the swaging can produce nicks in the music wire, which cannot be tolerated in many applications, as pointed out above.

For these and other reasons, the securing means is employed. A wide, flat wire element 13, which is preferably previously wound into a helix with space between the turns, is applied over the laid-up wires 12 starting intermediate the ends and progressing to the ends of wires 12. At or near the ends 14, 15, the strip is wound tightly, by means of a pair of pliers or a similar tool. Because of the tapered configuration resulting from winding to a smaller diameter, the adjacent convolutions come close together at the ends of the splice. The spacing between adjacent turns of the helical flat wire permits winding of the flat wire by the same manipulation as is employed in whipping or seizing. Of course, flat wire from a reel might be used, but the described construction is so convenient that no particular advantage accrues from the use of a reel of flat wire. The flat wire is preformed into a helix to tightly grip the wires it overlies, and readily accommodates itself to the different diameters of the splice proper.

The total length of the splice is not particularly critical. For .033" music wire as the smaller element, a foot is sufficient. There is no advantage in increasing the length of the splice, if it is properly made, which can be ascertained by inspection through the spaces between adjacent convolutions of the tape. If a shorter splice is desired, experiment with a testing machine will soon determine the required length.

With a splice made as above described, a phenomenon not customary in splices occurs. If the spliced line is run over suitable pulleys in a testing machine, the assembly eventually fails. The number of cycles causing failure depends, of course, on the load applied. When failure is due to breakage of one of the line wires, it is almost always the smaller wire, and the failure usually occurs near the end of the wrapping, at 14. This is to be expected. However, examination of failed splices shows that the ends of the line wires, originally butted together, are separated after failure, and, roughly speaking, the more cycles the assembly has undergone before failure, the greater the separation. Examination further reveals that the separation is not a result of strength of the wires 12, but is the result of a creep within the splice. The break, near the end of the wrapping, is a fatigue break. Investigation by making similar splices with means to hold the line wires immovable with respect to the wires 12 discloses that the creep seems to result in distribution of the inevitable fatigue at point 14 along the wire line 10, rather than at one point.

It is possible to load the assembly lightly enough, say at 50 or 55% of the ultimate strength of the smaller wire, so that failure requires thousands of cycles of the testing machine. Under such circumstances, failure can result from the wire slipping out of the splice, or failure at a point remote from the splice.

From what has been said, perhaps the impression arises that there is an element of uncertainty in the assembly. However, a splice of this nature can be guaranteed not to fail for a certain number of uses on a mission involving paying out an object and reeling it in. Upon completion of that number of missions, the splice can be cut out, and remade. Rigid splices in music wires, if stressed at 85% of the ultimate strength of the wire, will fail in one or two missions, while music wire spliced as described is capable of something like a hundred missions at the same loading. Under lower loading, the advantage is even more pronounced.

It will be appreciated that music wire can be utilized up to only a certain diameter, depending on the size of the pulleys and the diameter of the reel or drum employed. For line of greater strength, strand must be employed. It thus becomes necessary to splice music wire to strand at some point in the line. It is perfectly possible to use the short overlying wires 12 of FIG. 1 between a strand and a smaller solid wire, but as in all cases a minimum finished diameter of splice is desired, the construction shown in FIGS. 4, 5 and 6 is preferred. In this form, the strand 20, consisting (for example) of a center wire 21 and crown wires 22 is to be spliced to a single wire 23. In order to make such a splice, the crown wires are unlaid from the core 21, back a sufficient distance, and the core cut off at 24. The wire 23 to be spliced thereto is butted against the end 24 of the core, and the unlaid wires 22 are wrapped around the wire 23, forming a strand with the wire 23 as a core, as shown in FIG. 5. The flat wire 25 is applied in connection with the form shown in FIG. 1.

As the size and number of wires in strand 20, and the size of the line wire 23 are dictated by strength and other considerations, it is pointed out that the condition shown in FIG. 5, involving spaced outer wires, can have a greater or less spacing of the crown wires, depending upon circumstances. It has been found that if the end 26 of the line wire 23, due to creepage, moves to the left, in the drawing, it is retained by the coils of flat wire from leaving the body of the rope by forcing its way through the space between adjacent crown wires.

For the purpose of splicing a strand to a strand, the construction shown in FIGS. 7, 8 and 9 is suitable. The larger strand 30 is prepared by unlaying the crown wires 31 a sufficient distance, and cutting the core 32 at 33, as described in connection with FIG. 4. The smaller strand 34 is butted against the core 32, and the crown wires 31 laid around the strand 34. For the relatively small difference in diameter, the crown wires 31 can be made to lie in, and naturally follow the valleys between the adjacent wires 35 of the strand 34. A wrapping of flat wire 36 is then applied over the whole as before described to complete the splice.

This invention is, of course, not limited to the number of wires shown. It is perfectly possible to make a splice between a seven-wire strand and a strand composed of seven wires surrounded by another layer of wires, by treating the seven wires as a core, and substituting the seven wires for the core, exactly as the solid wire is utilized in FIG. 4 as a substitute for a single wire core 21.

There is a class of strand known as armored strand, which consists of strand wrapped with flat tape, the entire assembly then being swaged in a rotary swager, so the armor adheres tightly, is hardened by the cold working, and is given a high finish by the swaging dies. This material is used on aircraft towing missions which involve travellers on the wire or other abrasive uses, the armor being much longer lasting than the naked strand would be. In addition, the armor, to a considerable extent, protects the line from kinking. Such armored strand can readily be spliced by a technique similar to that described previously. The armor is unwrapped from the strand of both the lines to be spliced, a sufficient distance to form the splice. The armor so removed is cut off of the smaller strand and discarded. The core of the larger strand (whether a wire or group of wires) is removed from the larger strand by unlaying the outer wires thereof and cutting the core out. The smaller strand is butted to the cut core of the larger strand, and the crown wires thereof are laid around the smaller strand, as described in connection with FIG. 7. The armor of the larger strand is thereupon replaced. Because removing and replacing the armor increases the distance between convolutions a little, the armor will extend beyond the ends of the strand from which it was removed. It thus extends over the smaller strand. It can be cut off at or near the end of the armor around the smaller strand. A condition like that in FIG. 10 then prevails. The armor ends 41 and 42 might very well work loose and catch on various pieces of equipment. The reason they cannot be crimped tightly to the wire is that the cold working the flat wire undergoes during the swaging makes it hard and elastic. It could be swaged, but, especially in the field, the simplest procedure is to apply a ferrule. The ferrule 43 is comparatively thin, as it is only required to stay in place and does not transmit any significant force from one armor wire to the other.

We claim:
1. A splice between a pair of abutting wire lines comprising a plurality of helically disposed parallel wires extending along each wire, and a flat, tape-like wire wrapped around the helically disposed wires substantially from end to end.

2. A splice between a pair of abutting wires comprising a plurality of helically disposed, parallel wires extending along each wire, and a flat, tape-like wire wrapped around the helically disposed wires substantially from end to end.

3. A splice between a pair of abutting wires of different diameters comprising a plurality of helically disposed parallel wires of a size and number to tightly engage the smaller wire extending along each wire, and a flat, tape-like wire wrapped around the helically disposed wires substantially from end to end.

4. A splice between a strand having a core and a plurality of crown wires, and a wire line of a larger diameter than the core of the strand comprising at least some of the crown wires of the strand extending beyond the end of the strand core and helically disposed around the wire line, and a flat tape-like wire wrapped around the helically disposed crown wires substantially from the end of the core to the ends of the crown wires.

5. A splice between a strand having a core wire and a plurality of crown wires, and a single wire of a larger diameter than the strand core wire comprising at least some of the crown wires of the strand extending beyond the end of the strand core and helically disposed around the single wire, and a flat, tape-like wire wrapped around the helically disposed crown wires substantially from the end of the core to the ends of the crown wires.

6. A splice between a pair of strands of different diameters, the larger strand having a core and a layer of crown wires comprising such crown wires extending beyond the core and helically disposed around the smaller strand, and a flat, tape-like wire wrapped around the crown wires from at least the end of the core to the ends of the crown wires.

7. A splice between a pair of armored strands of different diameters, the larger diameter strand having a core and crown wires, including a portion of the smaller strand minus its armor substantially abutting the core of the larger strand, the crown wires of the larger strand extending helically along the unarmored portion of the smaller strand, the armor of the larger strand lying around the crown wires and the unarmored portion of the smaller strand to the armor of the smaller strand, and means securing the ends of the respective armors in place.

8. A splice between a pair of armored strands of different diameters, the larger diameter strand having a core and crown wires, including a portion of the smaller strand minus its armor substantially abutting the core of the larger strand, the crown wires of the larger strand extending helically along the unarmored portion of the smaller strand and lying in the valleys between the wires thereof, the armor of the larger strand lying around the crown wires and the unarmored portion of the smaller strand to the armor of the smaller strand, and a fitting securing the adjacent armor ends in place.

9. A splice according to claim 6 wherein said crown wires lie in the valleys between the wires of the smaller strand.

References Cited in the file of this patent
UNITED STATES PATENTS

| | | |
|---|---|---|
| 999,461 | Michaels et al. | Aug. 1, 1911 |
| 1,822,189 | Zapf | Sept. 8, 1931 |
| 2,943,434 | Joy et al. | July 5, 1960 |
| 3,007,300 | Peterson | Nov. 7, 1961 |